April 9, 1940.    L. DE FLOREZ ET AL    2,196,385
DIRECTIONAL CONTROL
Filed March 14, 1938    4 Sheets-Sheet 1
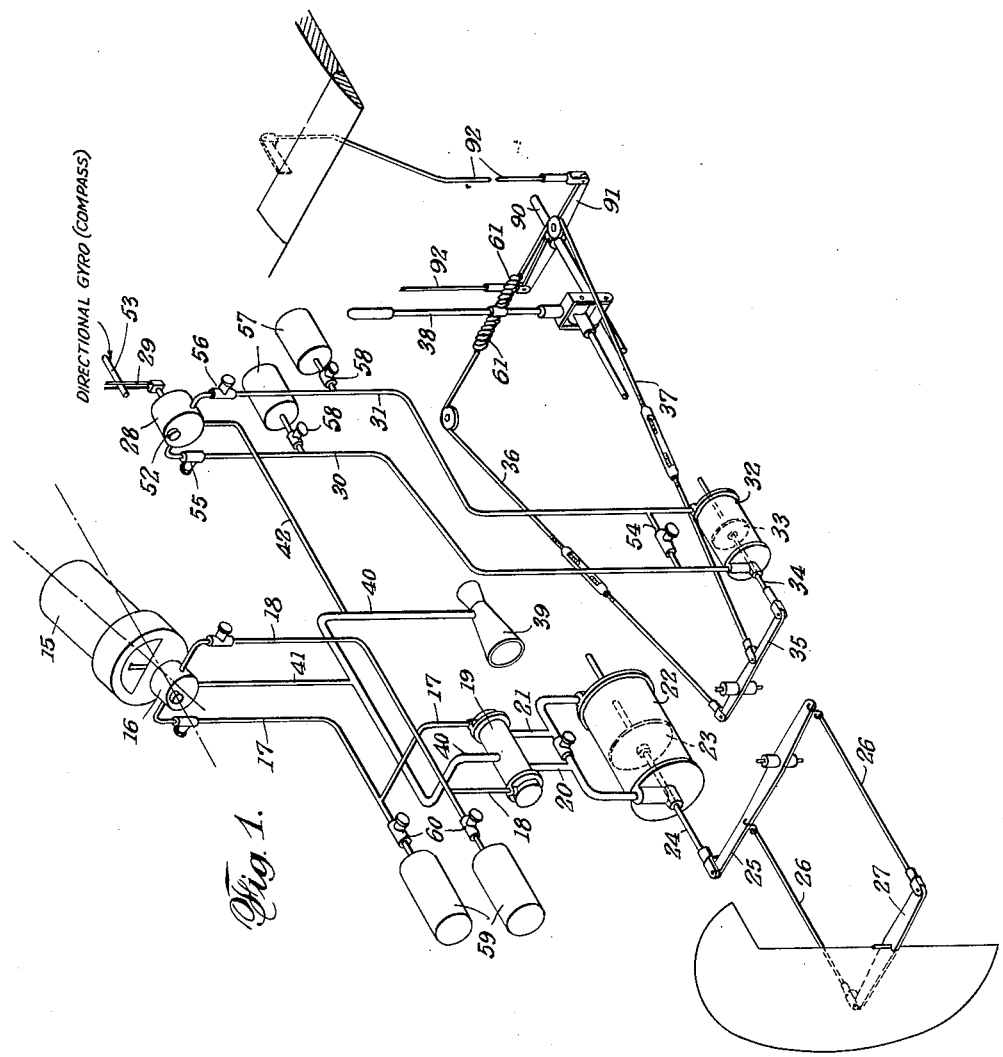
LUIS DE FLOREZ AND
EMMON BACH, INVENTORS
BY Philip J. McLean
ATTORNEY

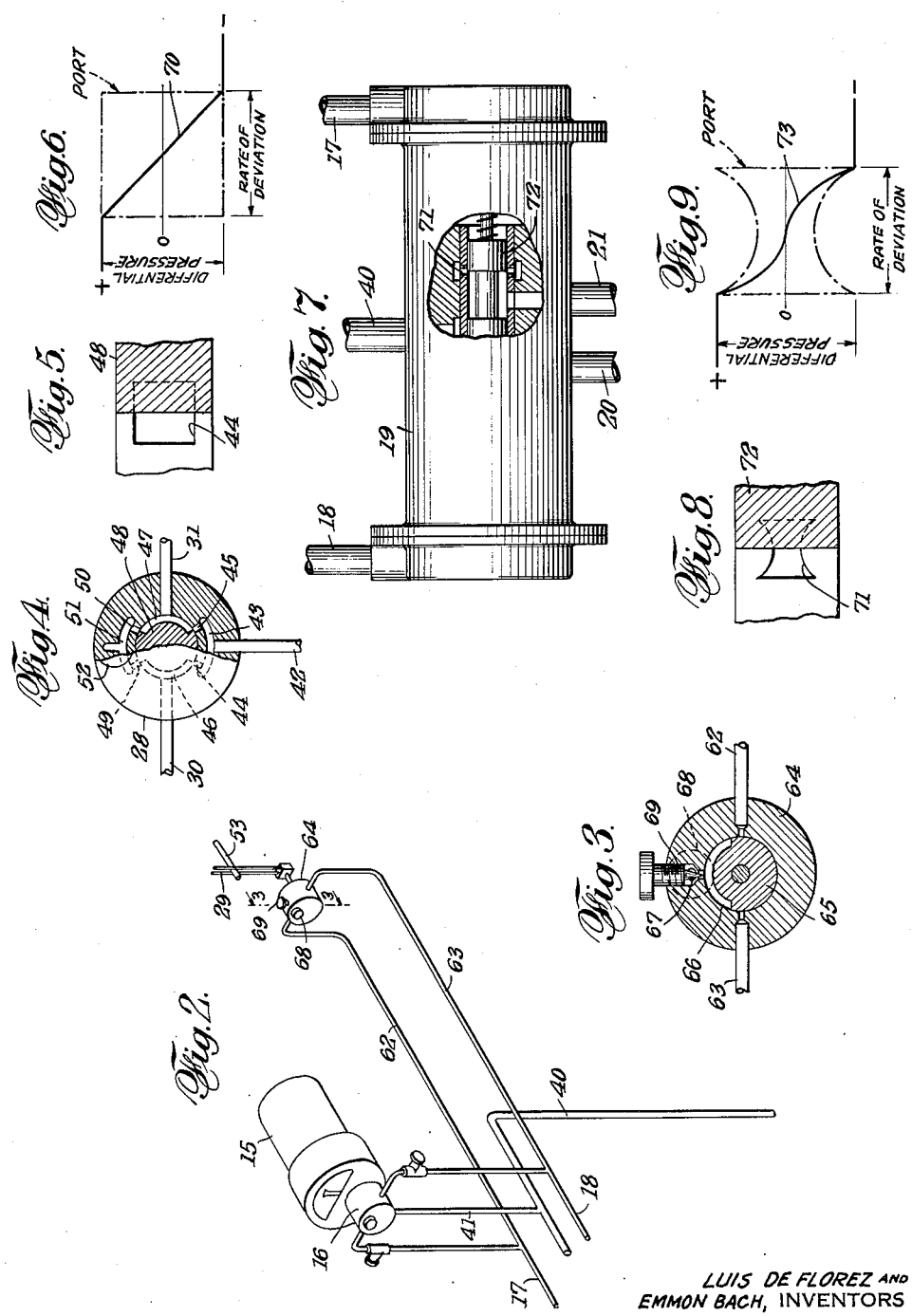

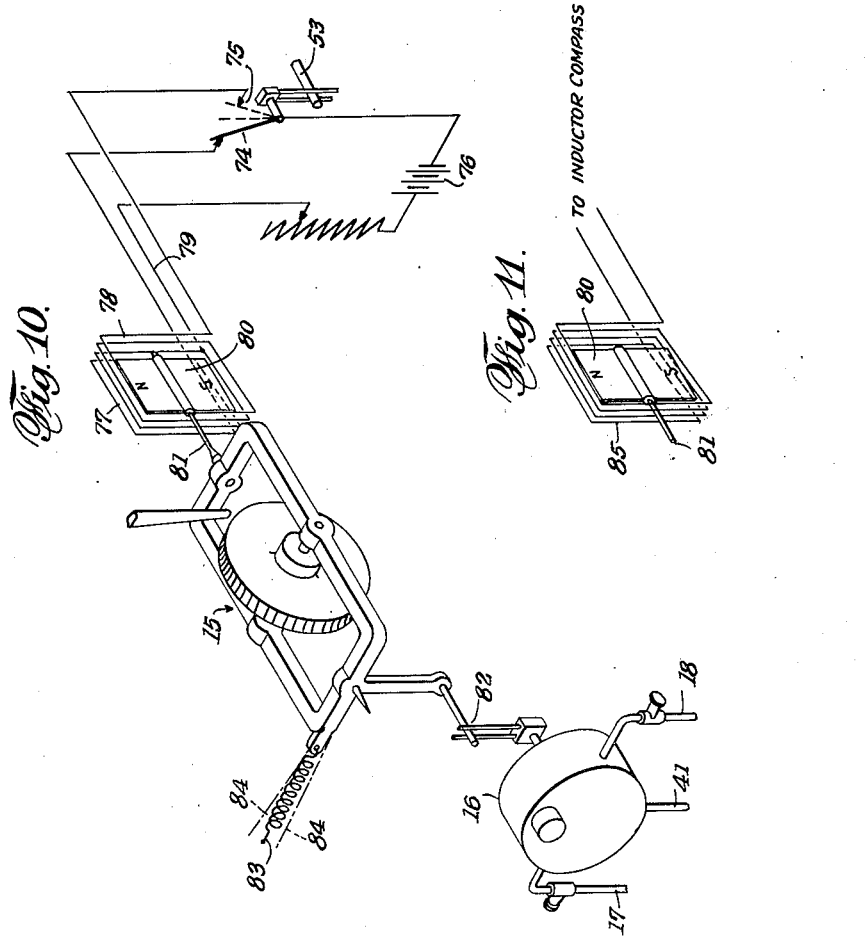

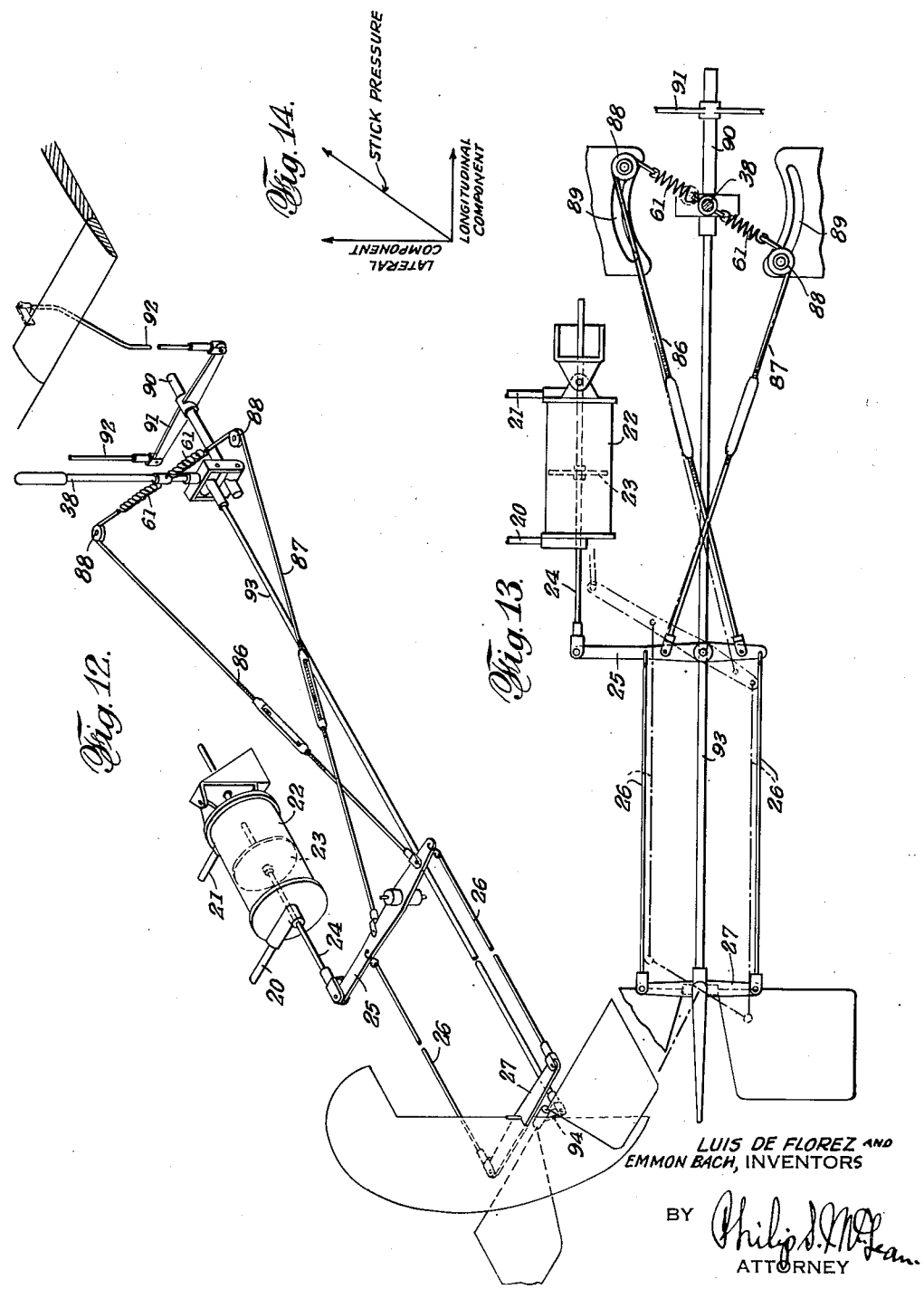

Patented Apr. 9, 1940

2,196,385

UNITED STATES PATENT OFFICE 2,196,385

DIRECTIONAL CONTROL

Luis de Florez, New York, and Emmon Bach, Yonkers, N. Y.; said Bach assignor to said de Florez Application March 14, 1938, Serial No. 195,808

17 Claims. (Cl. 244—76)

This invention relates to the directional control of dirigible craft.

One object of the invention is to provide in automatic piloting means, a form of supervisory or supplementary control, which will conpensate or correct for a change in heading, chronic or otherwise, which may be carrying a craft off course.

Reference is made to copending de Florez applications, Ser. Nos. 98,352, 139,868 and 165,956, relating to the general subject matter of automatic piloting means.

Another object of the invention is to automatically compensate and correct for the precessional effect from the motor and propeller resulting from the turning of the craft in one direction or the other.

The drawings accompanying and forming part of this specification illustrate certain definite practical embodiments of the invention. Structure however, may be changed in many ways all within the true intent and broad scope of the invention as hereinafter defined and broadly claimed.

Fig. 1 is a perspective and somewhat diagrammatic view illustrating airplane equipment for effecting major control by rudder, with supervisory or supplementary control responsive to deviation for gently bringing the plane back on to course through aileron control.

Fig. 2 is a generally similar view, illustrating a combination in which control of the rudder is modified and corrected for, if drift persists beyond a certain neutral or no control zone.

Fig. 3 is a broken sectional detail as on line 3—3 of Fig. 2, of the adjustable leak valve forming part of such supervisory control.

Fig. 4 is a broken detail of the sensitive control valve with parts in section.

Fig. 5 is a broken section illustrating the rectangular form of ports employed in this valve and Fig. 6 is a diagram illustrating the constant differential pressure change per linear unit of movement obtained with such ports.

Fig. 7 is a broken view of the control relay with parts in section.

Fig. 8 is a sectional view of the parabolic curve form of port shown in this relay valve to obtain maximum change per unit of deviation at the ends of the valve movement after the manner of the curve representing such movement, in Fig. 9.

Figs. 10 and 11 are diagrammatic views illustrating electrical forms of control.

Figs. 12 and 13 are perspective and plan views respectively showing diagrammatically the equipment for compensating for the usual nosing down and nosing up due to gyroscopic effect on turning, by application of pressure to the control stick.

Fig. 14 is a diagram of the component vertical and horizontal forces applied to the stick.

The form of rudder control illustrated in Fig. 1 is similar to that disclosed in the de Florez application Ser. 165,956 and comprising a rate gyro 10, 15, mounted with its precessional axis on an upward and forward incline so as to answer to roll as well as to turn, said gyro being arranged to actuate a sensitive control valve 16, connected by differential pressure lines 17, 18, with opposite ends of a relay valve 19, connected by differential pressure lines 20, 21, with the opposite ends of a power cylinder 22, containing piston 23, having a rod 24, operating lever 25, connected at 26, with the rudder bar 27.

Being susceptible to bank as well as to turn, this form of automatic pilot will come into action upon the occurrence of a list one way or the other, even before such rolling movement has become manifest in turning movement of the ship. Hence such a system is very sensitive and prompt in corrective measures.

However, with changes in balance of the ship as may occur from movement of the passengers or might result from other causes, a situation may be created where there will be a persistent tendency of the ship to continue in a deviation one way or the other, off the true course.

To counteract this drift tendency and to effect the bringing of the ship back on the course, there is provided in the illustration a supplementary control valve at 28, similar in construction to the first control valve 16, but actuated through connections 29, from a directional gyro or compass and connected by differential pressure lines 30, 31, with opposite ends of a power cylinder 32, containing piston 33, having a rod 34, operating bar 35, from which flexible connections 36, 37, extend to opposite sides of the stick 38.

The fluid under pressure for operation of the power cylinders may be obtained from any source and either positive or negative pressure may be employed. In the illustration, a single venturi 39, serves all purposes by having a line 40, extending to the relay 19 and branches 41, 42, extending to the suction chambers of the control valves 16, 28, respectively. As these valves are rotated, one by the combination bank and rate of turn gyro 15, or the other by the directional gyro, the suction chamber of the valve operated will be connected more with one differential line than with the other and the other line will be connected more with atmosphere, depending on direction and extent of valve movement. Considering structure of the valve 28, as exemplary, the suction chamber 43, Fig. 4, has ports 44, 45, opening to differential pressure lines 30, 31, by way of arcuate recesses 46, 47, in opposite sides of the rotatable valve member 48, which controls also the ports 49, 50, at the top, opening to atmospheric chamber 51, having an air filter inlet 52.

The operating connections at 29, between the supervisory directional gyro and valve 28, are shown as including yielding fingers forming a spring fork connected with the movable valve element 48, receiving the actuating pin or lug 53, projecting from the casing of the directional gyro. This construction may provide for a certain amount of lost motion as between the directional gyro and control valve, introducing a degree of lag, defining a neutral zone or angle of movement during which the directional gyro will have no effect and at the end of which movement, the directional gyro will effect an adjustment of the ailerons sufficient to bring the ship back into proper trim, thus to overcome the existing deviation and gently bring the ship back onto course.

A valved by-pass 54, Fig. 1, across the differential pressure lines 30, 31, can be adjusted either for "response" in which case it would be partly open to temper the effect of the differential pressures on the power piston 33, or be fully opened to cut the power cylinder out of operation. Adjustable flow restricting valves 55, 56, are shown interposed in the differential pressure lines by which such lines can be individually adjusted to compensate for such variables as may exist in the system. Also, if desired, vacuum accumulator tanks may be connected in on these lines as shown at 57, with valves 58, providing adjustable restrictions for varying the timing and effect of these tanks on the differential pressure power cylinder controlling the ailerons, similar in effect to the so-called "think" tanks 59, and variable restrictions 60, shown in conjunction with the rudder control and more fully disclosed in the de Florez patent applications Ser. Nos. 98,352, 139,868 and 165,956.

The fingers of the spring fork 29, may be so yieldable as to respond slowly to movement of the directional gyro, introducing such lag that this supplementary control may not come into operation during a sudden, quick turn and correction of such turn by the first or main control mechanism. If direct mechanical lag is desired, a dash pot or equivalent may be introduced in these connections or actual physical lost motion may be interposed by spreading the arms of the valve operated fork, so that it can only be actuated after the directional gyro has swung through a definite angle such as one or more degrees.

To prevent the automatic aileron control from interfering with normal use of the stick, yieldable elements 61, are shown interposed in the connections 36, 37, leading to opposite sides of the stick.

In the Fig. 2 illustrated form of the invention, the supervisory control effect for deviation is superimposed on the rudder control by connecting lines 62, 63, from a variable leak valve 64, with the differential pressure lines 17, 18, of the rudder control valve 16.

The construction of this leak valve is indicated in Fig. 3, where the movable valve element 65, which is actuated from the directional gyro at 53, through the spring fork connection 29, has an arcuate recess 66, which when the valve turns through a predetermined angle can connect one or the other of the lines 62, 63, with passage 67, open to atmosphere through an air filter inlet 68, said passage being subject to accurate adjustment by needle valve or equivalent 69.

With this second form of the invention, upon deviation continuing through a predetermined angle, such as would be sufficient in Fig. 3, to connect up one or the other of the lines 62, 63, with atmosphere, the differential pressures in the lines 17, 18, will be varied accordingly and the control effect on the rudder thereby modified to accomplish a "drifting" of the ship back to proper course.

While construction of the several valves may vary, it is desirable for prompt control that the valve ports have either a straight line deviation characteristic, such as illustrated in Figs. 4, 5 and 6, or even an increased control effect at the ends of valve movement, such as indicated in Figs. 7, 8, 9, or the reverse of circular ports which are of reduced effect at the ends of valve movement.

Fig. 4 illustrates one of the sensitive control valves made with substantially square ports 44, 45, 49, 50, as illustrated in enlarged detail Fig. 5. With such porting, the valve action may be represented by straight line 70, Fig. 6.

Fig. 7 illustrates the relay valve 19 of Fig. 1 as formed with ports 71, enlarged at opposite ends on reversed parabolic curves, so that with movement of valve element 72, the effect will be greatest at the opening and closing ends of the valve movement, producing a performance curve similar to that indicated at 73, in Fig. 9.

Fig. 10 illustrates a form of the invention wherein deviation is manifested electrically and applied directly to the precessional frame of the rate gyro. In this view, the movable element of the compass or directional gyro represented at 53, operates after a predetermined angle or time interval to close a switch at either of two points 74, 75, thus to cut electrical energy from a source 76, into either one or the other of two opposing coils 77, 78, having an intermediate common return 79, and acting in opposite directions electro-magnetically on a contained polarized element 80, rotatable on the axis of the precessional frame of the gyro and connected therewith at 81.

The precessional frame of this gyro is shown connected at 82, with the movable element of the sensitive control valve 16, which latter may be connected for rudder control as illustrated in Fig. 1. Also with a normalizing spring the mechanism described may be utilized for operation of a supplementary control valve such as the valve 28, Fig. 1.

The electrical couple disclosed is thus responsive to deviation and is timed to apply a small force to the precessional frame to the rate gyro, thus to change the zero position from the normal at 83, to such as represented by the broken lines at 84. This, like the others, is also three position control.

Fig. 11 illustrates a modification in which an inductor compass or the like is connected directly or through an amplifier to a deflector coil 85, acting on the polarized armature 80, to modulate the main control in proportion to the extent of deviation.

Figs. 12 and 13 illustrate equipment for offsetting the precessional force acting on the nose of the ship when turning. This force acting in a plane at right angles to the plane of turn tends to press the nose of the ship either up or down, depending upon the direction of turn and upon the direction of rotation of the motor. To offset such tendencies, flexible connections 36, 37, are shown extended forwardly from rudder control bar 25, about guide pulleys 88, in diagonally opposite directions to the control stick, so that with turn of the rudder in one direction, a "righting" pressure will be applied diagonally to the stick in the direction for use of the ailerons and elevator to correct for the nosing up and nosing down tendency resulting from turn of the ship. The guide pulleys 88, are shown as mounted for angular adjustment at 89, Fig. 13, so that the inclination and direction of applied pressure may be adjusted to suit the characteristics of the ship and the direction of rotation of the motor. Some ships require both aileron and elevator control when correcting for turn and the invention thus takes care of adjustment about all three axes when the power cylinder 22 is controlled from the combined rate of turn and rate of roll gyro indicated at 15, in Fig. 1. Correction about all three axes is obtained from only the one gyro.

The connections from the stick to ailerons and elevators are indicated in Figs. 1, 12 and 13, as more or less conventional, the lateral movement having the effect of rocking shaft 90, having outstanding arms 91, connected by links 92, with the ailerons and the fore and aft movement of the stick serving to actuate rod 93, connected with the lever arm 94, of the elevators.

The diagonal pull or pressure on the stick may be resolved into vertical and horizontal components such as indicated diagrammatically in Fig. 14.

In all forms of the invention, compensation for drift effect is accomplished without adversely affecting the control characteristics of the rate gyro. This supplementary control is shown of the three position type with a neutral band for example, of possibly plus or minus one degree within which supplemental control effect is zero and beyond which full effect is applied to restore the ship to course. The maximum supplementary control is therefore limited under all conditions to a value sufficient only to compensate for drift and can therefore never "fight" the major control.

The precessional effect is present whether the turn is caused directly by rudder movement or by other external forces. The correction for precession follows from the rate of turn control exercised over the power cylinder and, through the construction indicated, may be adjusted to assert the proper effect, which is, to cooperate in such a way as to resist turning off course and to urge the ship back onto course, without overswing. While all controls, involving rate of turn correction, supplementary or supervisory control for bringing back onto course after predetermined or continuing deviation and the further control, correcting for precession, may all be combined, it will be appreciated that they may be used conjointly in various combinations, particularly so because of the variable control characteristics of different ships. Also, it will be appreciated that while the constant deviation and the maximum end control design of valve ports are particularly desirable for sensitiveness and promptness of action, they are not essential to the control systems and may or may not be used, depending upon particular conditions or requirements.

By combining the mechanism for correcting for precessional effect, Figs. 12 and 13, with combined rate of turn and bank control of Fig. 1, a single gyro may be utilized to correct for turn, bank and pitch. With the precessional correction mechanism of Figs. 12 and 13, combined with the rate of turn and bank control of Fig. 2 however, the supervisory control of the directional instrument is superimposed on the rate of turn instrument, so as to modify its action for controlling turn, bank and pitch. In all cases, the action is to gently drift the ship back onto course, without subjecting it to abrupt action. The turn sensitive control mechanism constitutes means for quickly correcting or compensating for turn or for turn and bank and the directional sensitive control mechanism may be considered as constituting means to more slowly correct and compensate for deviation accumulated in the interval of delayed action, so as not to act if actually not required and if required, then to act only in a way to gradually drift the ship back onto course.

If desired, the flexible connections 36 and 37 in Fig. 1 may be extended diagonally to the stick, as in Figs. 12 and 13, so that the "righting" pressure will be applied to the stick through the medium of the power cylinder 32, controlled by the directional gyro.

For convenience, change in heading, whether occasioned by such causes as variations in trim or precession effect of the motor, or otherwise, have herein some places, for the sake of simplicity, been referred to as "drift" and the expression is therefore to be taken in that broad light. In place of controlling ailerons, the supplementary control may be applied to "control tabs" on the ailerons or to other more or less similar control surfaces. The invention is of broad scope, so terms employed are used in a broad and descriptive sense, rather than in a limiting way, except where intent or need for definite limitation may appear.

What is claimed is:

1. In combination with aircraft having rudder, aileron and elevator controls, rate of turn responsive means thereon connected to govern operation of said rudder control and directional responsive means thereon connected to govern operation of said aileron control.

2. In combination with an aircraft having rudder, aileron and elevator controls, rate of bank responsive means thereon connected to govern operation of said rudder control and directional responsive means thereon connected to govern operation of said aileron control.

3. In combination with an aircraft having rudder, aileron and elevator controls, rate of turn and bank responsive means thereon connected to govern operation of said rudder control and directional responsive means thereon connected to govern operation of said aileron control.

4. In combination with an aircraft having rudder, aileron and elevator controls, rate of bank responsive means thereon connected to govern operation of said rudder control and directional responsive means thereon connected to modify the control exercised by said rate of bank responsive means.

5. In combination with an aircraft having rudder, aileron and elevator controls, rate of turn and bank responsive means thereon connected to govern operation of said rudder control and directional responsive means thereon connected to modify the control exercised by said rate of turn and bank responsive means.

6. In aircraft control, the combination of rate of turn and bank sensitive means, rudder control mechanism controlled thereby, operative to quickly correct for turn and directional sensitive means operative to more slowly correct for deviation.

7. In combination, an aircraft having rudder, aileron and elevator controls, rate of change responsive means thereon and connected to govern operation of one of said controls and directional responsive means thereon and connected to govern operation of one or more of said other controls.

8. An aircraft having rudder, aileron and elevator controls, power means connected to operate said rudder control and connections from said power means for conjointly operating said aileron and elevator controls to correct for precession resulting from turning movement of the craft.

9. An aircraft having rudder, aileron and elevator controls and a universally shiftable stick for actuating said aileron and elevator controls, power means for operating said rudder control and connections from said power means for applying pressure to said stick on an inclined axis, to thereby apply pressure conjointly to said aileron and elevator controls to correct for vertical precession resulting from turning of the craft.

10. In combination, a dirigible craft provided with steering means, a rate of turn instrument on said craft, valve means controlled thereby, power mechanism for actuating said steering means and connected to be controlled by said valve means, supervisory valve means connected to modify the control exerted by said first valve means and directional sensitive means for controlling said second valve means in accordance with extent of deviation from course.

11. In combination, a dirigible craft provided with steering means, a rate of turn instrument on said craft, valve means controlled thereby, power mechanism for actuating said steering means and connected to be controlled by said valve means, supervisory valve means connected to modify the control exerted by said first valve means, directional sensitive means for controlling said second valve means in accordance with extent of deviation from course, said second valve means comprising a leak valve having communication with atmosphere and differential pressure lines connected with the first valve means.

12. In combination with a dirigible craft, a rate of turn instrument thereon, power mechanism governed by said rate of turn instrument, attitude control means actuated by said power mechanism, means for effecting correction for deviation from course, directional responsive means and a delayed action form of connection between said directional responsive means and said deviation correcting mechanism.

13. In combination with an aircraft having rudder, aileron and elevator controls, a rate of turn instrument and mechanism governed thereby for actuating the rudder control to correct for turn, a directional sensitive instrument and mechanism having a delayed action connection with said directional sensitive instrument and arranged to apply a supplementary governing force over one or more of said controls to correct for deviation from course.

14. In combination with an aircraft having rudder, aileron and elevator controls, a rate of change instrument thereon and connected to govern operation of said rudder and directional responsive means on said craft and connected to govern operation of said aileron control and elevator controls.

15. In combination with a dirigible aircraft subject to precessional movement about one axis when subjected to control about an axis angularly related to the first, means for controlling movement of said aircraft about the latter axis, means for effecting control of the aircraft about said first axis and connections from said first control means for variably operating said second mentioned control means in a direction and to an extent to substantially overcome the precessional movement about said first axis resulting from control applied for movement about said second axis.

16. In combination, a dirigible aircraft subject to "nosing up" or "nosing down" as a result of the precessional forces manifested from right and left turning movements, a rudder and means for actuating same for right and left turning movements, pitch controlling means for said aircraft and connections from said rudder actuating means for effecting operation of said pitch control means in the direction and to an extent to approximately compensate for the nosing up or nosing down precessional force attendant on rudder actuation.

17. In combination, a dirigible aircraft, a rate of turn instrument thereon, a rudder, rudder actuating means under control of said rate of turn instrument, directional responsive means on said craft and a delayed action form of control connection from said directional responsive means for modifying action of said rudder actuating means to correct for deviation from course in a time interval following operation of said rudder actuating means.

LUIS DE FLOREZ.
EMMON BACH.